(12) United States Patent
Capilla et al.

(10) Patent No.: US 8,183,847 B2
(45) Date of Patent: May 22, 2012

(54) DC-DC CONVERTER CONTROLLER HAVING OPTIMIZED LOAD TRANSIENT RESPONSE

(75) Inventors: Jose M. Capilla, Tournefeuille (FR); Olivier Causse, Leguevin (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 12/891,277

(22) Filed: Sep. 27, 2010

(65) Prior Publication Data

US 2011/0012578 A1 Jan. 20, 2011

Related U.S. Application Data

(60) Division of application No. 11/817,766, filed as application No. PCT/US2007/061039 on Jan. 25, 2007, now Pat. No. 7,843,181, which is a continuation-in-part of application No. PCT/US2005/038408, filed on Oct. 24, 2005.

(51) Int. Cl.
*G05F 1/00* (2006.01)
(52) U.S. Cl. .................................... 323/282; 323/271
(58) Field of Classification Search .................. 323/222, 323/271, 282, 283, 288
See application file for complete search history.

(56) References Cited

U.S. PATENT DOCUMENTS

| | | | |
|---|---|---|---|
| 4,672,303 A | 6/1987 | Newton | |
| 5,481,178 A | 1/1996 | Wilcox et al. | |
| 5,731,694 A | 3/1998 | Wilcox et al. | |
| 5,994,885 A | 11/1999 | Wilcox et al. | |
| 6,304,066 B1 | 10/2001 | Wilcox et al. | |
| 6,580,258 B2 | 6/2003 | Wilcox et al. | |
| 2002/0190701 A1* | 12/2002 | Miyazaki | 323/284 |
| 2006/0125454 A1* | 6/2006 | Chen et al. | 323/282 |
| 2006/0220623 A1* | 10/2006 | Andruzzi et al. | 323/276 |

* cited by examiner

*Primary Examiner* — Nguyen Tran
(74) *Attorney, Agent, or Firm* — Robert F. Hightower

(57) ABSTRACT

In one embodiment, a power supply controller is configured to turn off a first output transistor but inhibit turning off a second output transistor.

10 Claims, 8 Drawing Sheets

DC-DC CONVERTER CONTROLLER HAVING OPTIMIZED LOAD TRANSIENT RESPONSE

CROSS-REFERENCE TO RELATED APPLICATIONS

The present application is a divisional of application U.S. Ser. No. 11/817766 filed Sept. 4, 2007 now U.S. Pat. No. 7,843,181 which is the national stage filing of International Application PCT/US2007/061039 filed Jan. 25, 2007, which is a continuation-on-part application of PCT Application No. PCT/US2005/038408, filed on Oct. 24, 2005, which corresponds to U.S. patent application Ser. No. 11/572727 filed Jan. 27, 2007 now U.S. Pat. No. 7,728,573 issued on Jun. 1, 2010, all of which are hereby incorporated by reference, and priority thereto for common subject matter is hereby claimed.

BACKGROUND OF THE INVENTION

The present invention relates, in general, to electronics, and more particularly, to methods of forming semiconductor devices and structure.

In the past, the semiconductor industry utilized various methods and structures to make power supply controllers for power supply systems. Some applications of the previous power supply controllers included loads that could reduce the amount of current required to operate below. Some of the previous power supply controllers could detect the reduced current demand and change the operating mode to a light load mode. These previous power supply controllers generally cannot rapidly decrease the value of the output voltage of the power supply.

Accordingly, it is desirable to have a method of forming a power supply controller that facilitates detecting a light load current demand rapidly reducing the value of the output voltage.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
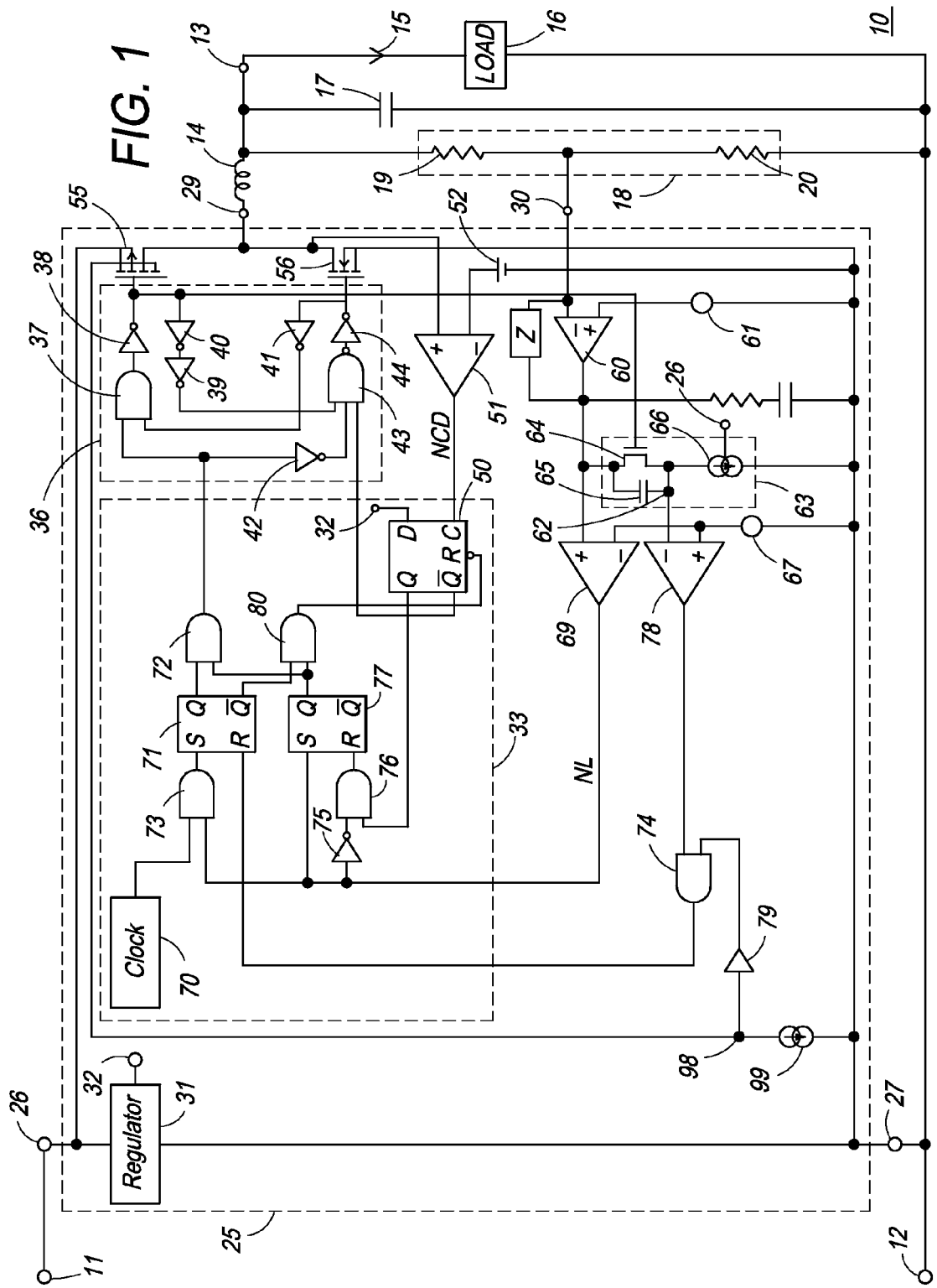
FIG. 1 schematically illustrates an embodiment of a portion of a power supply control system including a power supply controller in accordance with the present invention.

FIG. 1 schematically illustrates an embodiment of a power supply system 10 that includes an exemplary embodiment of a portion of a power supply controller 25 that accurately adjusts the value of an output voltage of system 10 responsively to the output voltage increasing to an undesirable value. System 10 receives power between a power input terminal 11 and a power return terminal 12, and generates the output voltage between a voltage output terminal 13 and terminal 12. System 10 typically includes a load 16 that is connected between terminals 12 and 13 in order to receive the output voltage, an energy storage inductor 14, a smoothing capacitor 17, and a feedback network 18. Feedback network 18 may be any one of a variety of feedback networks that are well known to those skilled in the art including the exemplary embodiment of a voltage divider, formed by a first resistor 19 and a second resistor 20, that generates a feedback signal that is representative of the value of the output voltage. The feedback signal generally is formed at a common node between resistors 19 and 20. In some embodiments, feedback network 18 may be a portion of controller 25. Also, capacitors may be connected in parallel with each of resistors 19 and 20 for frequency compensation.

Controller 25 includes a voltage input 26 and a voltage return 27 that are typically connected to respective terminals 11 and 12 to receive an input voltage. A first power switch or transistor 55 and a second power switch or transistor 56 of controller 25 are selectively switched in order to provide a current through an output 29 of controller 25 and regulate the value of the output voltage on terminal 13. A driver circuit 36 of controller 25 is utilized to assist in controlling the switching of transistors 55 and 56. For the exemplary embodiment illustrated in FIG. 1, controller 25 is configured as a voltage mode switching controller and typically includes a logic and control circuit 33, an error amplifier 60, a mode detection comparator 69, a negative current comparator 51, a ramp generator or ramp 63, a PWM comparator 78, a current sense detector 79, reference generators or references 61 and 67, and an AND gate 74. Amplifier 60 typically is a transconductance amplifier and has a compensation network, illustrated by an impedance Z along with a resistor and a capacitor on the output of amplifier 60, to provide frequency compensation and gain control. In some embodiments impedance Z may be a derivator. In most embodiments, controller 25 also includes an internal regulator 31 that is connected between input 26 and return 27 in order to receive the input voltage and create an internal operating voltage on an output 32 that is used for operating the various elements of controller 25 such as amplifier 60, comparator 69, and control circuit 33. Driver circuit 36 receives control signals and responsively forms a first switching signal that is utilized to control transistor 55 and a second switching signal that is utilized to control transistor 56. In the exemplary embodiment illustrated in FIG. 1, transistor 55 is a P-channel SenseFET type of transistor that includes a sense element or sense transistor that provides a sense current that is representative of the current flowing through transistor 55. A SenseFET type of transistor generally is formed to include a main transistor and a sensing transistor. Typically, the SenseFET type of transistor is formed of many transistor cells that are interconnected to form a large transistor. For a P-channel SenseFET type of transistor, a few of the cells have their drains separated from the drains of the remaining cells and are brought to a separate external terminal or sense terminal of the sense transistor of the SenseFET. The remainder of the drains are connected together to form the main drain of the main portion of the transistor. One example of a SenseFET type of transistor is disclosed in U.S. Pat. No. 4,553,084 issued to Robert Wrathall on Nov. 12, 1985, which is hereby incorporated herein by reference. SENSEFET is a trademark of Motorola, Inc. of Schaumburg, Ill.

Driver circuit 36 typically includes an inverting buffer 38 and an inverting buffer 44 that have output stages that are sufficient to drive the load presented by the control electrode of the power switches, such as the gates of respective transistors 55 and 56. Buffers 38 and 44 generate respective first and second switching signals that drive the gates of respective transistors 55 and 56. Circuit 36 also includes logic to control the switching states of transistors 55 and 56 including an AND gate 37, a NAND gate 43, and delay inverters 39, 40, 41, and 42. Logic and control circuit 33 includes logic that generates a switching control signal, such as a pulse width modulated (PWM) control signal, and a negative current detection (NCD) control signal that are used by circuit 36. Circuit 33 generally includes a clock generator or clock 70, a PWM latch 71, a mode latch 77, a negative current detection (NCD) flip-flop 50, inverter 75, and AND gates 72, 73, 76, and 80.

Ramp 63 includes a ramp capacitor 65, a ramp current source 66, and a discharge switch or discharge transistor 64. For the exemplary embodiment illustrated in FIG. 1, ramp current source 66 is a variable current source that varies the current through source 66 proportionally to variations of the value of the input voltage from input 26. The switching signal is used to control transistor 55 is also used to control transistor 64. As the first switching control signal begins enabling transistor 55, the first switching control signal also disables transistor 64 which allows capacitor 65 to charge a rate determined by the difference between the value of current source 66 and the value of the error signal from amplifier 60. The error signal is applied to one side of capacitor 65 and current source 66 is applied to the other side of capacitor 65. In the preferred embodiment, the error signal is an error voltage.

Controller 25 is configured to operate in a normal operating mode and a light load operating mode. During normal operation in the normal operating mode, load 16 is active and requires a load current 15 which requires controller 25 to supply a current to inductor 14 to maintain load current 15. In this normal mode, controller 25 switches transistors 55 and 56 to supply current to and discharge current from inductor 14. If the value of load current 15 required by load 16 decreases, the switching of transistors 55 and 56 may cause the value of the output voltage to increase. If the output voltage increases too far, it may increase past the desired value of the output voltage and may damage load 16. Thus, in this light load condition controller 25 is configured to limit the value of the output voltage to an upper limit that is established substantially by the gain of amplifier 60 and the value of the reference signal from reference 67. Those skilled in the art will appreciate that there may be minor parasitic offsets and delays so that the upper limit is not established exactly by the value of the second reference signal. Amplifier 60 receives the feedback signal from an input 30 of controller 25 and generates an error signal that represents the deviation of the feedback signal from the value of a first reference signal supplied by reference 61. Mode detection comparator 69 receives the error signal and compares the error signal to a second reference signal from reference 67. If the error signal is greater than the second reference signal, a normal load (NL) control signal or NL signal on the output of comparator 69 is high indicating that the value of current 15 required by load 16 keeps the output voltage less than the upper limit that is determined substantially by the second reference signal. The high NL signal sets latch 77 to set controller 25 to the normal operating mode. Conversely, if the value of the error signal is less than the value set by the second reference signal from reference 67, comparator 69 forces the NL signal low indicating that the value of current 15 required by load 16 is low and the value of the output voltage has increased to a value no less than the upper limit. As will be seen further hereinafter, the low NL signal assists in setting controller 25 to the light load operating mode.

In operation and assuming that the value of current 15 required by load 16 keeps the output voltage less than the upper limit value so that the NL signal is high and has set latch 77, clock 70 generates a clock signal that is utilized to control the timing of the switching signals used to drive transistors 55 and 56. Thus, the frequency of the clock signal from clock 70 sets a switching period during which the first and second switching signals may be formed and utilized to drive transistors 55 and 56. Since the NL signal is high, the high from clock 70 propagates through gate 73 and sets PWM latch 71. The low from the Q bar output of latch 71 clears flip-flop 50. Because latch 77 is set, the high from the Q output of latch 71 propagates through gate 72 and is received by circuit 36. The high from gate 72 forces the output of inverter 42 low and the output of gate 43 high and the output of buffer 44 low to begin disabling transistor 56. The low from buffer 44 forces the output of delay inverter 41 high which, along with the high from gate 72, forces the output of gate 37 high. The high from gate 37 begins enabling transistor 55 to supply current through output 29 to charge inductor 14. The sense transistor of transistor 55 supplies a sense current to node 98. The sense current and current source 99 function as a current comparator that forces node 98 to the voltage from the greater of current source 99 or the sense current. If the value of the voltage formed at node 98 is greater than the threshold value of detector 79, the output of detector 79 goes high indicating that the value of current supplied to inductor 14 is greater than a minimum value desired for charging inductor 14. If the output of detector 79 is low, it indicates that the value of the current used to charge inductor 14 is less than the minimum desired value for charging inductor 14.

Error amplifier 60 receives the feedback signal from input 30 and forms the error signal. Those skilled in the art will appreciate that the error signal from amplifier 60 varies in value responsively to variations in the value of the output voltage on terminal 13. Ramp 63 receives the error signal and sums the error signal with the ramp from capacitor 65 and forms a modulated error signal on a summing node 62. PWM comparator 78 compares the modulated error signal to the second reference signal from reference 67 and forms a modulated PWM signal on an output of comparator 78. When the value of the modulated error signal reaches a value that is no less than the second reference signal from reference 67, comparator 78 forces the modulated PWM signal high indicating that transistor 55 should be disabled. The modulated PWM signal is received by gate 74. If the output of current detector 79 is high, the modulated PWM signal forces the output of gate 74 high which resets PWM latch 71. The high from the Q bar output of latch 71 forces the output of gate 80 high to remove the reset signal from flip-flop 50. The low from the Q output of latch 71 forces the switching control signal on the output of gate 72 low. Circuit 36 receives the low which forces the output of gate 37 low and the output of buffer 38 high thereby beginning to disable transistor 55. The low from gate 72 also forces the output of inverter 42 high which is received by one input of gate 43. The high from buffer 38 propagates through delay inverters 39 and 40 and forces another input of gate 43 high thereby forcing the output of gate 43 low and the output of buffer 44 high to begin enabling transistor 56. Note that flip-flop 50 was previously cleared which applied a high to the remaining input of gate 43. Those skilled in the art will appreciate that inverters 39 and 40 form a delay that prevents enabling transistor 56 until transistor 55 is beginning to be disabled which assists in preventing shoot-through currents through transistors 55 and 56. During this delay time, current continuity is provided through the body diode, not shown, of transistor 56. Enabling transistor 56 begins discharging the energy stored in inductor 14.

Transistor 56 remains enabled and discharging inductor 14 until the value of the discharge current from inductor 14 is less than the value of return 27 and begins to reverse polarity. Negative current comparator 51 is configured to detect the current reversal and form a second control signal or negative current detection (NCD) control signal on the output of comparator 51 indicating the discharge current from inductor 14 has reversed by at least a small amount. In one embodiment, the reference input of comparator 51 is configured to have a negative offset voltage to ensure that comparator 51 detects a negative current and not a positive or zero current. The offset typically is an offset formed on the input stage of comparator 51 but may be an external voltage applied to comparator 51. The offset is illustrated in FIG. 1 by an offset voltage 52. Typically, the amount of the offset ensures that the current from inductor 14 has reversed by at least a small amount including an amount between approximately 0.05 and sixty (60) milli-amperes and preferably by approximately twenty (20) milli-amperes. The negative current detection forces the NCD control signal high which sets flip-flop 50. The low from the Q bar output disables gate 43 and forces the output of buffer 44 low which begins disabling transistor 56. The high from the Q output enables gate 76 but the output of gate 76 remains low because the NL signal remains high. As long as controller 25 can control the value of the output voltage to keep the feedback signal close to the value of the first reference signal from reference 61, the NL remains high and controller 25 and system 10 remain operating in the normal operating mode, thus, clock 70 continues to initiate switching cycles for switching transistors 55 and 56. Those skilled in the art will appreciate that during the normal operating mode, another clock signal from clock 70 may start another switching cycle of controller 25 thereby disabling transistor 56 before the NCD signal can disable transistor 56.

During the operation of controller 25, the value of current 15 required by load 16 may decrease. In this condition when controller 25 enables transistor 55 to charge inductor 14, the value of the output voltage on terminal 13 may increase due to the decreased current required by load 16. The increased output voltage also increases the feedback signal and decreases the value of the error signal on the output of amplifier 60. As the value of the output voltage increases to no less than the upper limit, the error signal decreases to less than the second reference signal from reference 67. Comparator 69 responsively forces the NL signal low indicating that the current requirements of load 16 have decreased below the value required to prevent the output voltage from increasing. The low from comparator 69 forces the output of gate 73 low thereby inhibiting clock 70 from initiating another switching cycle of controller 25. Since flip-flop 50 previously was reset when transistor 55 was enabled, the low from comparator 69 does not affect the state of latch 77. Thus, transistor 55 remains enabled independently of the output of comparator 69 changing state. Consequently, controller 25 continues to operate in the normal operating mode, but without clock 70 generating more switching cycles, so that ramp 63 forms the modulated error signal, PWM comparator 78 forms the modulated PWM signal, and the output of gate 74 going high responsively to the sense current from transistor 55. The high from gate 74 resets latch 71. The high Q bar output removes the reset signal from flip-flop 50. The low Q output of latch 71 forces gate 72 low and the output of buffer 38 high thereby beginning to disable transistor 55. After the delay of inverters 39 and 40, the low from gate 72 begins enabling transistor 56. Enabling transistor 56 discharges the energy stored in inductor 14 to assist in preventing the value of the output voltage from the increasing further and to begin quickly decreasing the value of the output voltage. Transistor 56 remains enabled and discharging inductor 14 until the value of the discharge current from inductor 14 reverses in value and forces the NCD control signal on the output of comparator 51 high. The high from comparator 51 sets flip-flop 50. The low Q bar output forces the output of gate 43 high and the output of buffer 44 low to begin disabling transistor 56. Since the NL signal is low, the high Q output of flip-flop 50 resets latch 77 and places controller 25 in the light load operating mode. As long as the value of the output voltage is no less than the upper limit, the error signal remains less than the value of the second reference signal from reference 67 and the NL signal remains low inhibiting clock 70 from initiating another switching cycle of controller 25. As can be seen, a first control signal inhibits the initiation of subsequent switching cycles from controller 25. The charging of inductor 14 is disabled responsively to the value of the output voltage and the charging current, and discharging of inductor 14 is enabled responsively to disabling the charging of inductor 14. Subsequently, as the discharge current from inductor 14 reverses, a second control signal terminates the discharging of inductor 14. Those skilled in the art will appreciate that the NL control signal or the Q output of latch 77 may also be used to disable other internal blocks, not shown, in order to assist in reducing power dissipation.

As the output voltage decreases below the upper limit, the value of the error voltage increases and comparator 69 forces the NL signal high to permit clock 70 to initiate switching cycles of controller 25 and to reset latch 77 thereby again setting controller 25 to operate in the normal operating mode.

In order to implement this functionality for controller 25, regulator 31 is connected between input 26 and return 27. Input 26 is connected to the main source of transistor 55. The sense drain or the drain of the sense transistor of transistor 55 is commonly connected to node 98, a first terminal of current source 99, and an input of detector 79. A second terminal of source 99 is connected to return 27. A drain of transistor 55 is commonly connected to output 29, a non-inverting input of comparator 51, and to a drain of transistor 56. A source of transistor 56 is connected to return 27. A gate of transistor 55 is commonly connected to the output of buffer 38, an input of inverter 40, and the gate of transistor 64. An output of inverter 40 is connected to an input of inverter 39 which has an output connected to a first input of gate 43. A second input of gate 43 is connected to an output of inverter 42 which has an input commonly connected to a first input of gate 37 and the output of gate 72. A third input of gate 43 is connected to the Q bar output of flip-flop 50. An output of gate 43 is connected to an input of buffer 44 which has an output commonly connected to the gate of transistor 56 and an input of inverter 41. An output of inverter 41 is connected to a second input of gate 37. An output of gate 37 is connected to an input a buffer 38. A first input of gate 72 is connected to the Q output of latch 71 and a second input of gate 72 is commonly connected to the Q output of latch 77, and a first input of gate 80. The Q bar output of latch 71 is connected to a second input of gate 80 which has an output connected to the reset input of flip-flop 50. The set input of latch 71 is connected to an output of gate 73. A first input of gate 73 is connected to the output of clock 70 and a second input of gate 73 is commonly connected to the set input of latch 77, an input of inverter 75, and the output of comparator 69. The output of inverter 75 is connected to a first input of gate 76. An output of gate 76 is connected to the reset input of latch 77 and a second input of gate 76 is connected to the Q output of flip-flop 50. An inverting input of comparator 51 is connected to one terminal of offset 52 which has a second terminal connected to return 27. The output of comparator 51 is connected to the clock input of flip-flop 50. A D input of flip-flop 50 is connected to output 32 of regulator 31. An inverting input of amplifier 60 is connected to receive the feedback signal from input 30. A non-inverting input of amplifier 60 is connected to a first terminal of reference 61 which has a second terminal connected to return 27. The output of amplifier 60 is commonly connected to a non-inverting input of comparator 69, a drain of transistor 64, and a first terminal of capacitor 65. A source of transistor 64 is commonly connected to node 62, a second terminal of capacitor 65, a first terminal of current source 66, and an inverting input of comparator 78. A second terminal of current source 66 is connected to return 27. A first terminal of reference 67 is connected to return 27 and a second terminal is commonly connected to an inverting input of comparator 69 and an inverting input of comparator 78. The output of comparator 78 is connected to a first input of gate 74. A second input of gate 74 is connected to an output of detector 79. An output of gate 74 is connected to a reset input of latch 71.

Figure 2:
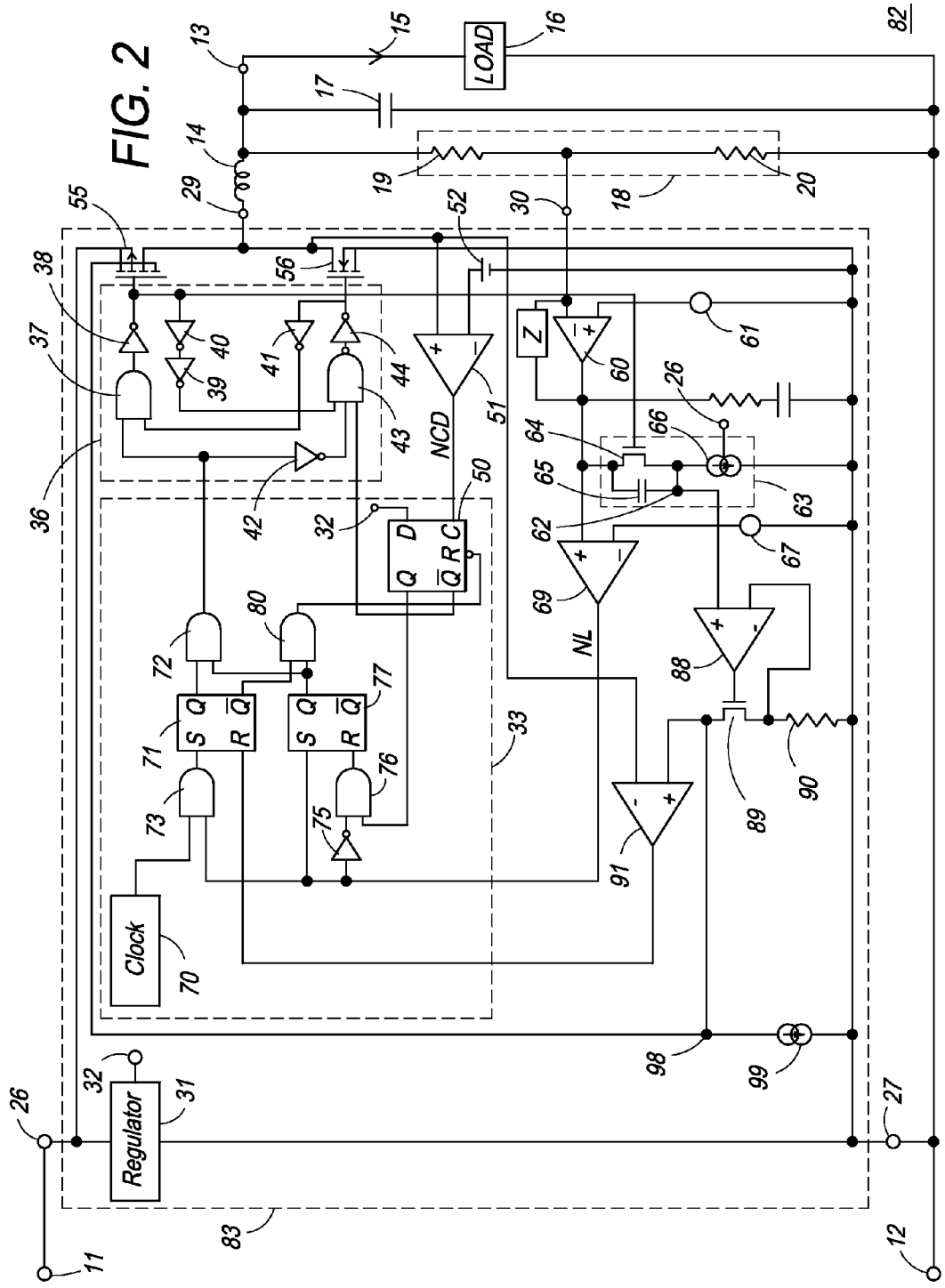
FIG. 2 schematically illustrates an embodiment of a portion of another power supply control system including another power supply controller that is an alternate embodiment of the system and controller of FIG. 1 in accordance with the present invention.

FIG. 2 schematically illustrates an embodiment of a power supply system 82 that is an alternate embodiment of system 10 described in the description of FIG. 1. System 82 includes an exemplary embodiment of a portion of a power supply controller 83 that is an alternate embodiment of controller 25 described in the description of FIG. 1. Controller 83 functions similarly to controller 25, however, controller 83 is a current mode controller instead of a voltage mode controller. Comparator 78, gate 74, and detector 79 of controller 25 are replaced by amplifier 88, transistor 89, resistor 90, and comparator 91. An amplifier 88, a transistor 89, and a resistor 90 are used for the current mode regulation loop of controller 83. Amplifier 88 receives the modulated error signal from node 62. Amplifier 88 together with transistor 89 and resistor 90 convert the voltage from node 62 into a current. The output of comparator 91 provides a signal that functions similarly to the output of gate 74.

Figure 3:
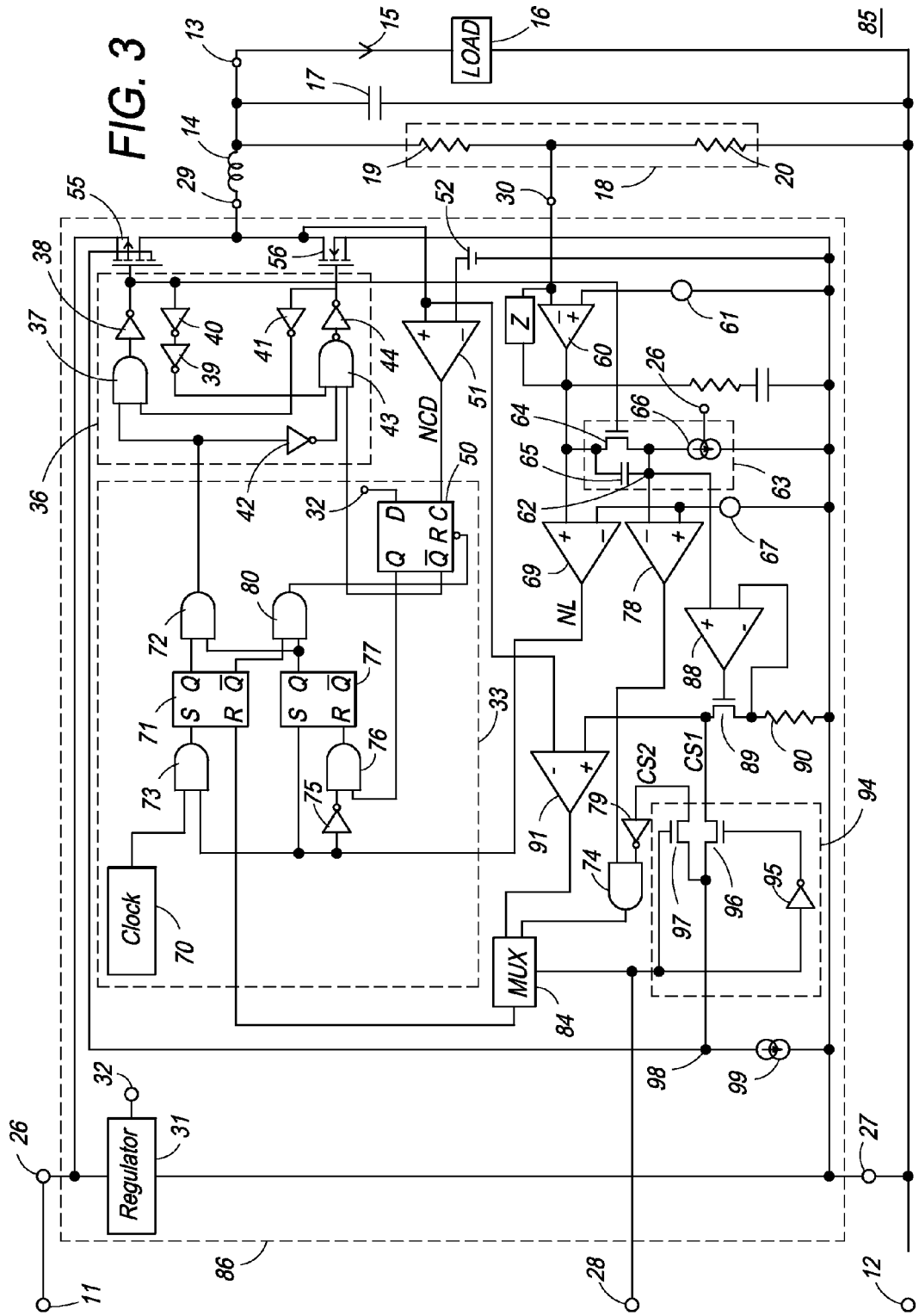
FIG. 3 schematically illustrates an embodiment of a portion of yet another power supply control system including yet another power supply controller that is an alternate embodiment of the system and controller of FIG. 1 and FIG. 2 in accordance with the present invention.

FIG. 3 schematically illustrates an embodiment of a power supply system 85 that is an alternate embodiment of system 10 described in the description of FIG. 1. System 85 includes an exemplary embodiment of a portion of a power supply controller 86 that is an alternate embodiment of controller 25 described in the description of FIG. 1. Controller 86 is selectable between a voltage mode controller such as controller 25 of FIG. 1 and a current mode such as controller 83 of FIG. 2. Controller 86 includes a mode control input 28 that facilitates switching between the voltage mode controller configuration and the current mode configuration. An analog multiplexer 94 receives the mode control signal and responsively selects the signal from node 98 to either detector 79 or comparator 91. A digital multiplexer 84 receives the mode control signal and responsively selects either the output of gate 74 or comparator 91 to the reset input of latch 71. Those skilled in the art will appreciate that the signal on input 28 typically has to also modify the value of capacitor 65, current source 66, and impedance Z in order to provide proper switching between the appropriate compensation for the two different modes.

Figure 4:
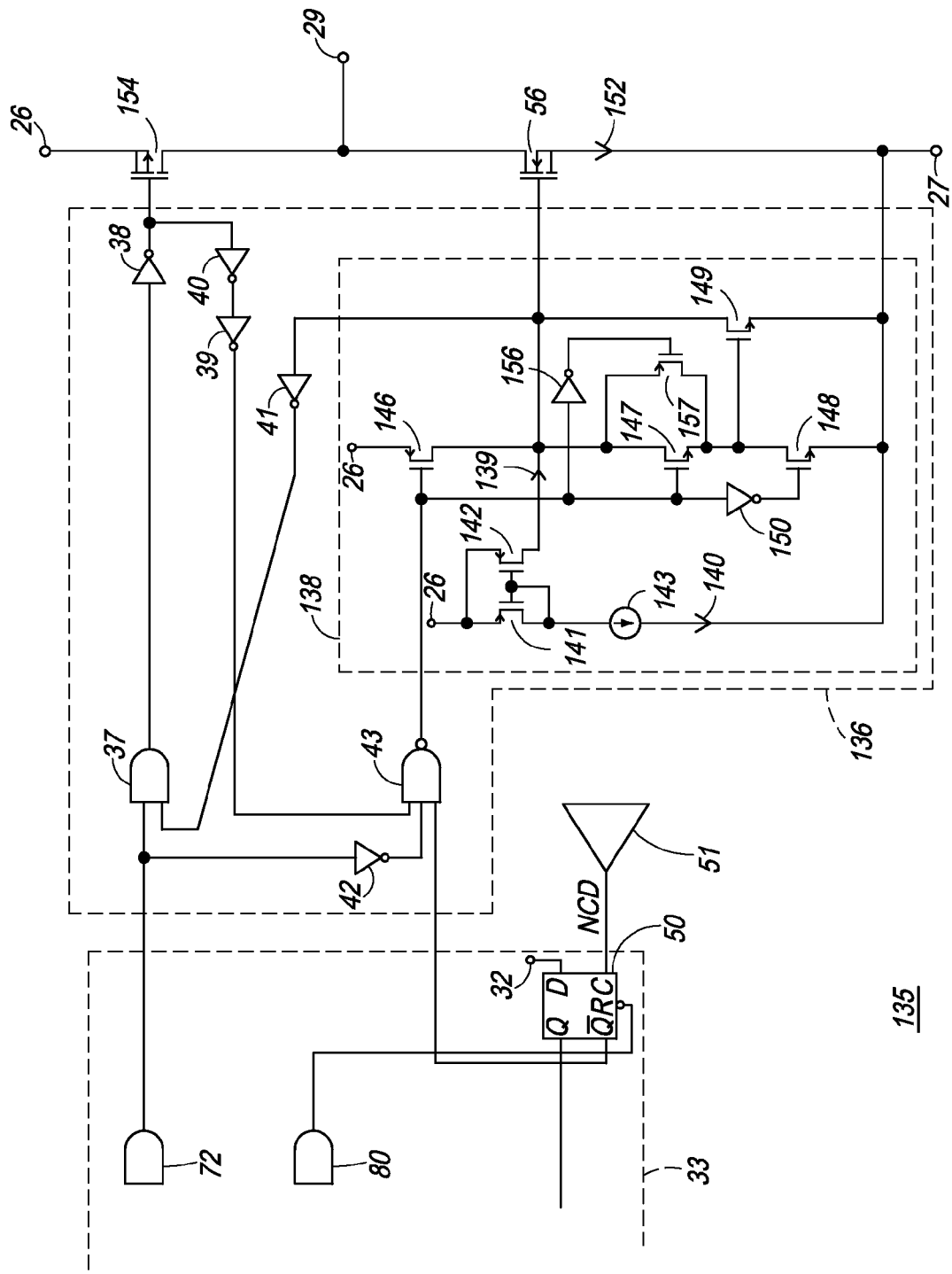
FIG. 4 schematically illustrates an embodiment of a portion of another power supply controller that is an alternate embodiment of the power supply controller of FIG. 1, FIG. 2, and FIG. 3 in accordance with the present invention.

FIG. 4 schematically illustrates a portion of an embodiment of a power supply controller 135 that is an alternate embodiment of controller 25 that was explained in the description of FIG. 1. Controller 135 is similar to controller 25, however, transistor 55 is replaced by switching transistor 154. Additionally, current source 99, current source detector 79, and AND gate 74 are omitted. A current control circuit 138 is added to driver circuit 36 in order to form driver circuit 136. Driver circuit 136 functions similarly to driver circuit 36 but includes control circuit 138 that is used to inhibit turning off of transistor 56 including inhibiting turning off of transistor 56 when transistor 154 is turned off for a period of time that is greater than a cycle of clock 70. Control circuit 138 includes current mirror coupled transistors 141 and 142, a current source 143, transistors 146, 147, 148; 149, and 157 in addition to inverters 150 and 156. Current source 143 forms a current 140 that flows through transistor 141. The current mirror connection of transistors 141 and 142 causes a current 139 to flow through transistor 142 and to an output of the current mirror. Current 139 is ratioed to current 140 by the size ratio between transistors 141 and 142.

When the output of gate 72 is low, the output of gate 37 is also low which forces the output of buffer 38 high and disables transistor 154. Assuming that the Q bar output of flip-flop 50 is high, the low from gate 72 forces the output of gate 43 low. The low from gate 43 forces the output of inverter 150 high which enables transistor 148 to pull the gate of transistor 149 low and disable transistor 149. The low from gate 43 also forces the gate of transistor 146 low to enable transistor 146. Enabling transistor 146 pulls the gate of transistor 56 high and enables transistor 56. Thus, transistor 154 is disabled and transistor 56 is enabled to sink current from inductor 14. As described hereinbefore, transistor 56 remains enabled until the NCD signal causes transistor 56 to be disabled.

When the output of gate 72 is high, the output of inverter 42 is low which forces the output of gate 43 high. The high from gate 43 also disables transistor 146 so that transistor 146 does not affect the operation of transistor 56. The high from gate 43 forces the output of inverter 150 low to disable transistor 48. The high from gate 43 also enables transistors 147 and 157 which connects the gate of transistors 149 and 56 in a current mirror configuration. Current mirror coupled transistors 149 and 56 are also coupled to receive the output of the current mirror formed by transistors 141 and 142. Current 139 flows through transistor 149 and the current mirror configuration forces a current 152 through transistor 56 that is ratioed to current 139 by the area ratio of transistors 149 and 56. Preferably, the value of current source 143, the area ratio of transistors 141 and 142, and the area ratio of transistors 149 and 56 are selected so that the gate-to-source voltage (Vgs) of transistor 56 is no less than the threshold voltage of transistor 56 when transistor 56 is conducting the value selected for current 152. This ensures that transistor 56 conducts a value of current 152 that is sufficient to ensure that transistor 56 is not turned off. For the embodiment illustrated in FIG. 4, inverter 41 is designed to have its threshold voltage higher than the threshold of transistor 56. In this way, when transistor 56 conducts current 152, the output of inverter 41 goes high.

In one example embodiment, transistor 56 was configured to conduct a current of approximately one micro-ampere. At that value of current 152, the threshold voltage of transistor 56 was approximately 0.45 volts and the Vgs applied to transistor 56 was approximately 0.5 volts. Thus, the Vgs was no less than the threshold voltage at the value of current conducted by transistor 56.

In another alternate embodiment of controller 135, the transfer gate configuration of transistors 147, 157, and inverter 156 may be replaced by a transistor such as transistor 147. In still another alternate embodiment of controller 135, transistor 154 may be replaced by transistor 55 in which case, current source 99, current source detector 79, and AND gate 74 may remain as a portion of controller 135.

In order to assist in providing this functionality for controller 135, a first current carrying electrode of transistor 146 is connected to input 26 and a second current carrying electrode is commonly connected to the gate of transistor 56, a first current carrying electrode of transistor 142, a first current carrying electrode of transistor 149, a first current carrying electrode of transistor 157, and a first current carrying electrode of transistor 147. A gate of transistor 146 is commonly connected to the output of gate 43, a gate of transistor 147, an input of inverter 156, and an input terminal of inverter 150. An output of inverter 150 is connected to a gate of transistor 148. An output of inverter 156 is connected to a gate of transistor 157. A source of transistor 147 is commonly connected to a gate of transistor 149 and a drain of transistor 148. A drain of transistor 157 is commonly connected to a gate of transistor 149 and a drain of transistor 148. A source of transistor 142 is commonly connected to a source of transistor 141 and to input 26. A drain of transistor 141 is connected to a first terminal of current source 143 which has a second terminal connected to return 27 in addition to a source of transistor 148 and a source of transistor 149.

Figure 5:
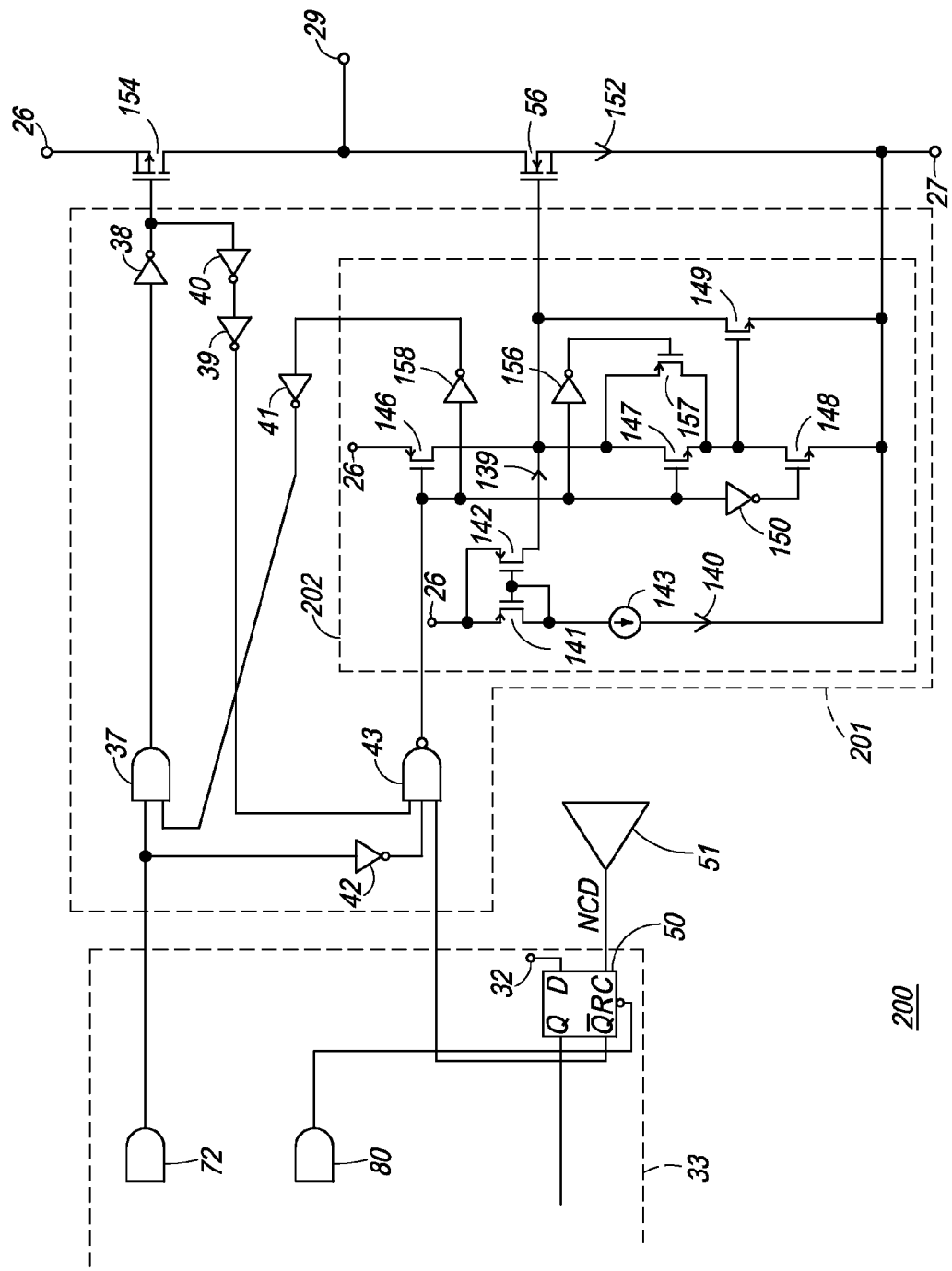
FIG. 5 schematically illustrates an embodiment of a portion of another power supply controller that is an alternate embodiment of the power supply controller of FIG. 1, FIG. 2, FIG. 3, and FIG. 4 in accordance with the present invention.

FIG. 5 schematically illustrates a portion of an embodiment of a power supply controller 200 that is an alternate embodiment of controller 135 that was explained in the description of FIG. 4. Controller 200 is similar to controller 135, however, controller 200 has a driver circuit 201 that includes a current control circuit 202. Circuit 202 is similar to circuit 138 but an inverter 158 is added and the input of inverter 41 is changed. The input of inverter 41 is now connected to the output of inverter 158, and the input of inverter 158 is connected to the output of gate 43. In this embodiment, the threshold voltage of inverter 41 does not have to be increased. When the output of gate 43 is high, the output of inverter 158 is low, so the output of inverter 41 is high. When the output of gate 43 is low, the output of inverter 158 is high, so the output of inverter 41 is low.

Figure 6:
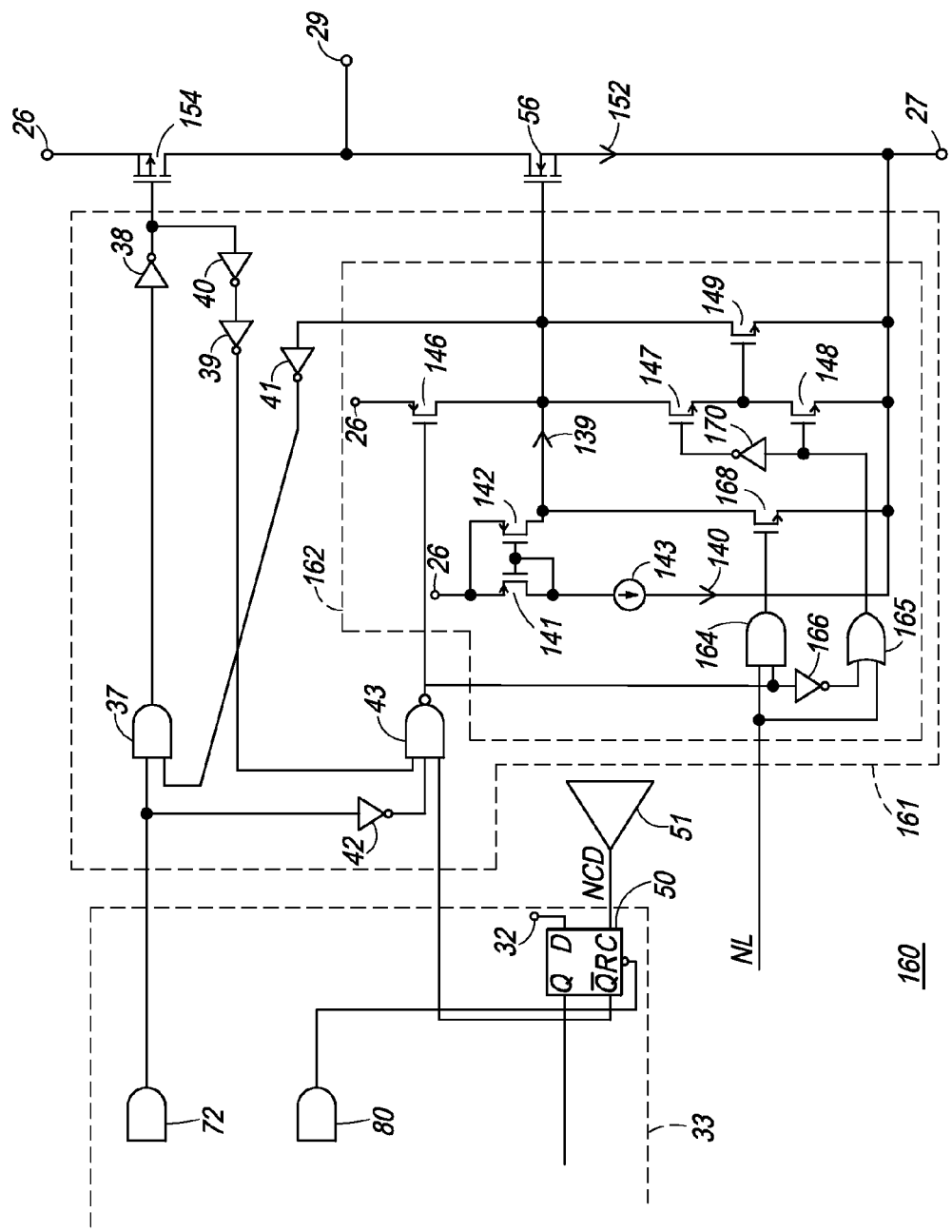
FIG. 6 schematically illustrates an embodiment of a portion of another power supply controller that is an alternate embodiment of the power supply controller of FIG. 1, FIG. 2, FIG. 3, FIG. 4, and FIG. 5 in accordance with the present invention.

FIG. 6 schematically illustrates a portion of an embodiment of a power supply controller 160 that is an alternate embodiment of controller 135 that was explained in the description of FIG. 4. Controller 160 is similar to controller 135, however, controller 160 has a driver circuit 161 that includes a current control circuit 162. Circuit 162 is similar to circuit 138 of FIG. 4 but circuit 162 only inhibits turning off transistor 56 when the NL signal is not active. As indicated hereinbefore, the low state of the NL signal indicates that the value of current 15 required by load 16 (FIG. 1) is low and the value of the output voltage has increased to a value no less than the upper limit. The low NL signal assists in setting controller 160 to the light load operating mode. Circuit 162 includes an AND gate 164, an OR gate 165, inverts 166 and 170, and a transistor 168.

When the NL signal is high, gate 164 is enabled to be controlled by the output of gate 43. Consequently, when the output of gate 43 is high, transistor 168 is enabled to sink the current from transistor 142. Enabling transistor 168 prevents transistor 142 from providing current to control transistor 56. The high from gate 43 also forces the output of gate 165 high. The high from gate 165 enables transistor 148 and disables transistor 147. Enabling transistor 148 pulls the gate of transistor 149 to return 27 which disables transistor 149 thereby allowing the output of gate 43 to control transistor 56. When the output of gate 43 is high, transistor 56 is transistor disabled, and when gate 43 is low transistor 56 is enabled.

When the NL signal is low, the output of gate 164 is also low which disables transistor 168. The low NL signal also enables gate 165 to be controlled by gate 43. When gate 43 is low, the output of gate 165 goes high. The high from gate 165 enables transistor 148 and disables transistors 147 and 149 thereby allowing the low from gate 43 to enable transistor 56. When gate 43 is high, transistor 146 is disabled and the output of gate 165 is low. The low from gate 165 disables transistor 148 and enables transistor 147 thereby coupling transistor 56 in the current mirror configuration with transistor 149. Current 139 flows through transistor 149 and the current mirror configuration forces current 152 through transistor 56 that is ratioed to current 139 by the area ratio of transistors 149 and 56. Thus, circuit 162 only inhibits turning off transistor 56 when the output voltage is no less than the upper limit.

Figure 7:
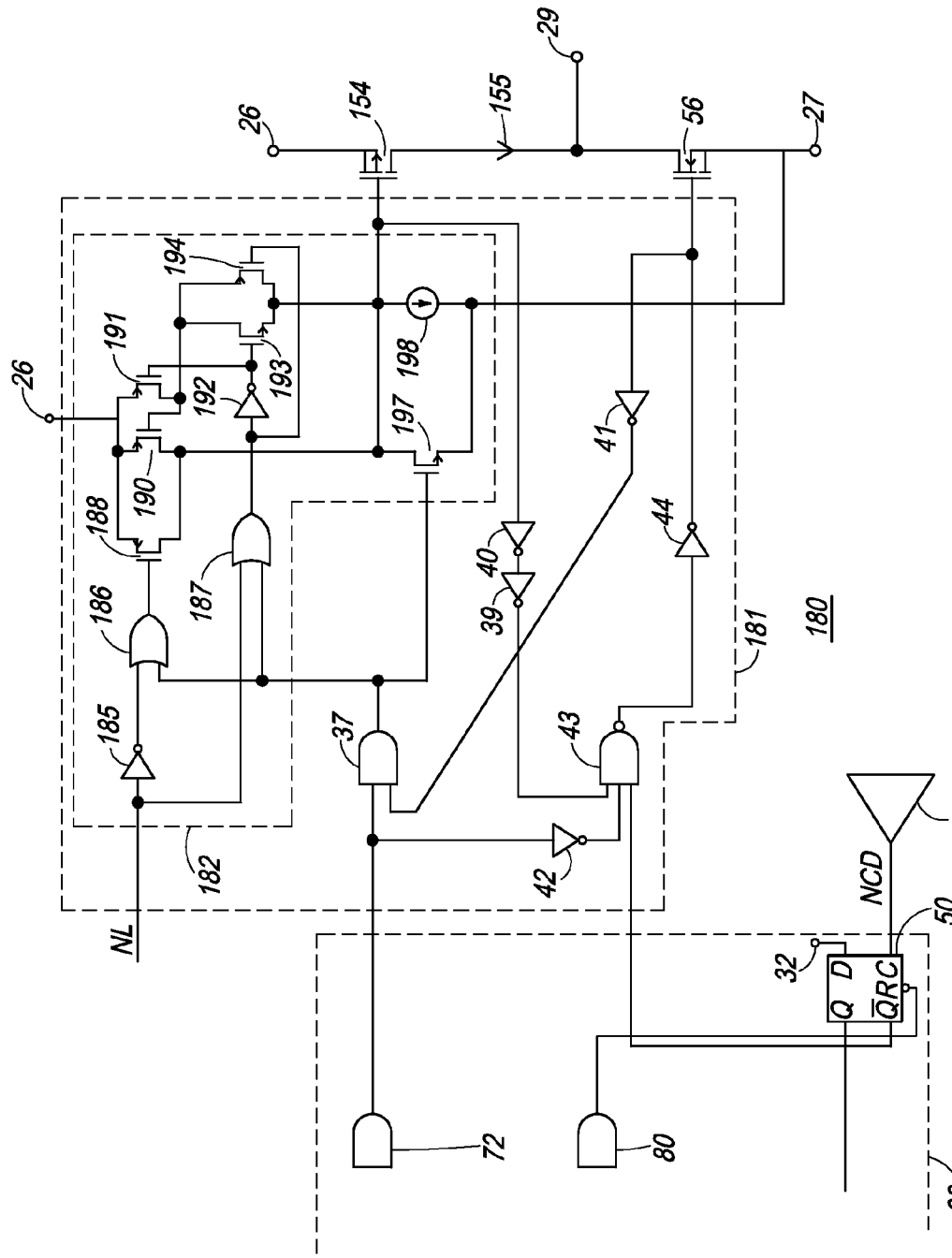
FIG. 7 schematically illustrates an embodiment of a portion of another power supply controller that is an alternate embodiment of the power supply controller of FIG. 1, FIG. 2, FIG. 3, FIG. 4, FIG. 5, and FIG. 6 in accordance with the present invention.

FIG. 7 schematically illustrates a portion of an embodiment of a power supply controller 180 that is an alternate embodiment of controller 135 that was explained in the description of FIG. 4. Controller 180 is similar to controller 135, however, controller 180 is configured to inhibit turning off transistor 154 instead of transistor 56. Controller 180 has a driver circuit 181 that includes a current control circuit 182 that is configured to inhibit turning off transistor 154. Circuit 182 includes inverters 185 and 192, OR gates 186 and 187, current source 198, and transistors 188, 190, 191, 193, 194, and 197. Transistors 193 and 194 are coupled to function as a transfer gate.

When NL is high, the output of gate 187 is high and the output of inverter 192 is low, so transistors 193 and 194 are disabled. The high from gate 187 also enables transistor 191 to pull the gate of transistor 190 high and disable transistor 190. The high NL signal forces the output of inverter 185 low which allows the output of gate 37 to control transistor 188 through gate 186. The output of gate 37 also controls transistor 197. When the output of gate 37 goes low, transistor 197 is disabled and the output of gate 186 is forced low. The low from gate 186 enables transistor 188 which pulls the gate of transistor 154 to substantially the voltage of input 26 thereby disabling transistor 154. When the output of gate 37 is high, transistor 197 is enabled to pull the gate of 154 low thereby enabling transistor 154.

When NL is low, the output of inverter 185 is high which forces the output of gate 186 high. The high from gate 186 disables transistor 188 and allows the output of gate 37 to control gate 187. When the output of gate 37 is low, transistor 197 is off. The low from gate 37 forces the output of gate 187 low and the output of inverter 192 high. The high from inverter 192 disables transistor 191. The low NL signal disables transistor 188 through gate 186. The low from gate 187 also enables the transfer gate of transistors 193 and 194 to connect transistor 154 in a current mirror configuration with transistor 190. The current from current source 198 flows through transistor 190 and the current mirror configuration forces a current 155 to flow through transistor 154 that is ratioed to current the current of source 198 by the area ratio of transistor 190 to transistor 154. Preferably, the value of current source 198 and the area ratio of transistors 190 and 154 are selected so that the gate-to-source voltage (Vgs) of transistor 154 is no less than the threshold voltage of transistor 154 when transistor 154 is conducting the value selected for current 155. Thus, when NL is low and gate 37 goes low, the Vgs applied to transistor 154 is no less than the threshold voltage at the current that is conducted by transistor 154, thus, transistor 154 is inhibited from being turned off. Consequently, circuit 182 only inhibits turning off transistor 154 when the output voltage is no less than the upper limit.

When the output of gate 37 is high, transistor 197 is enabled to pull the gate of transistor 154 low. Also, the output of gate 187 is high, the transfer gate of transistors 193 and 194 is off, and the gate of 191 is low so transistor 190 is disabled. Consequently, transistor 154 is enabled.

In another embodiment, inverter 185, gates 186 and 187; and transistor 188 may be omitted. In such an embodiment, transistor 154 is inhibited from being turned off each time that the output of gate 37 goes low independently of the state of the NL signal.

Figure 8:
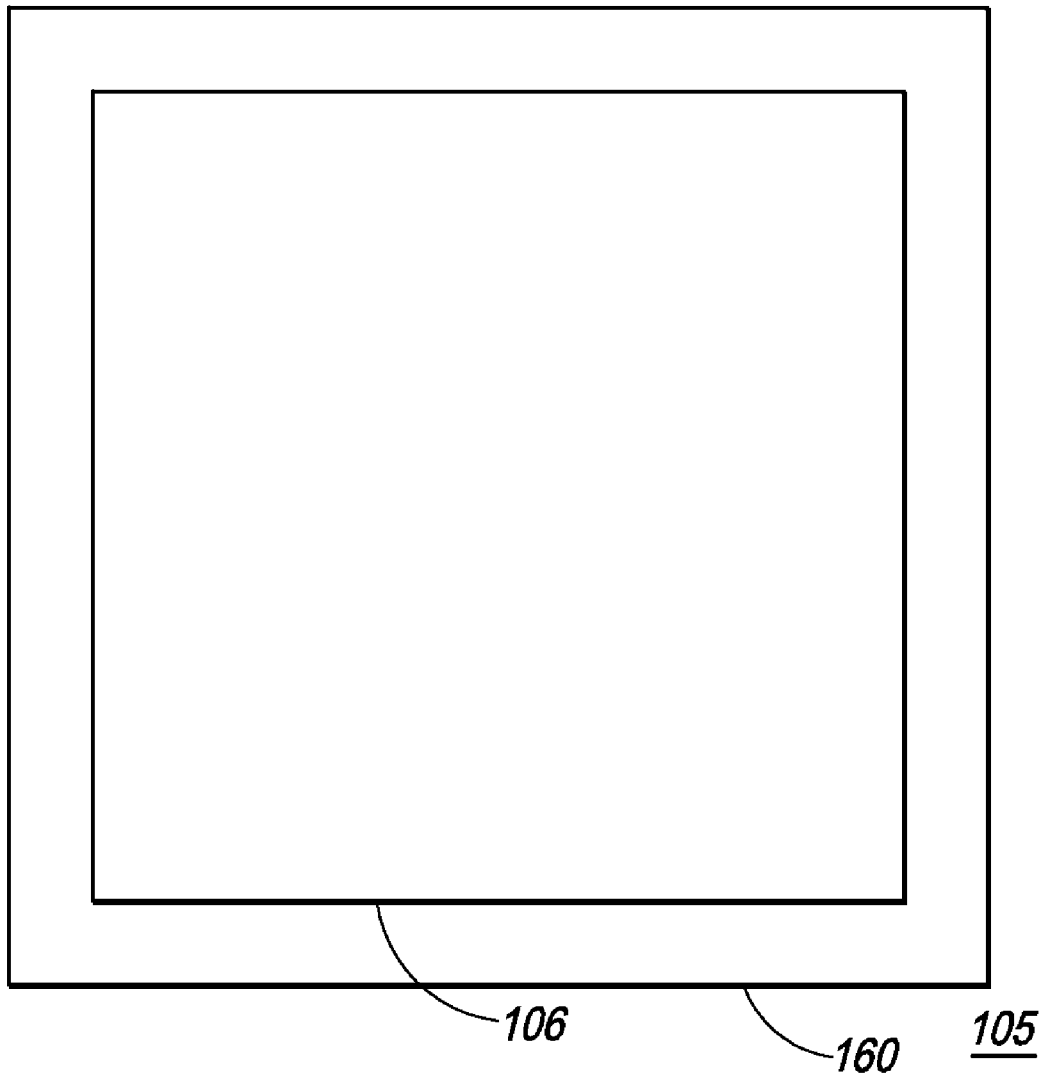
FIG. 8 schematically illustrates an enlarged plan view of a semiconductor device that includes the power supply controller of FIG. 1 in accordance with the present invention.

FIG. 8 schematically illustrates an enlarged plan view of a portion of an embodiment of a semiconductor device 105 that is formed on a semiconductor die 106. Controllers 25 or 135 or 160 or 180 may be formed on die 106. Die 106 may also include other circuits that are not shown in FIG. 7 for simplicity of the drawing. Controllers 25 or 135 or 160 or 180 and device 105 are formed on die 106 by semiconductor manufacturing techniques that are well known to those skilled in the art. In other embodiments, either controller 83 or 86 may be formed on die 106 instead of controllers 25 or 135 or 160.

In view of all of the above, it is evident that a novel device and method is disclosed. Included, among other features, is forming a controller that accurately limits an upper limit of the output voltage during a light load condition, and rapidly reduces the value of the output voltage to a desired value. Using two different control signals to control the switching of the output transistors facilitates rapidly reducing the value of the output voltage. Additionally, forming circuit 138 to inhibit turning off transistor 56 when transistor 154 enabled is believed to be novel.

While the subject matter of the invention is described with specific preferred embodiments, it is evident that many alternatives and variations will be apparent to those skilled in the semiconductor arts. More specifically the subject matter of the invention has been described for a particular logic structure, although the method is directly applicable to other logic implementations that control the output transistors to rapidly reduce the value of the output voltage. Those skilled in the art will appreciate that controllers 25, 83, and 86 may have multiple voltage inputs and returns that are similar to input 26 and return 27. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A power supply controller comprising:
   a first drive circuit configured to form a first switching signal to drive a first transistor as a high side transistor that configured to supply a current to a load;
   a second drive circuit configured to form a second switching signal to drive a second transistor as a low side transistor coupled in series with the first transistor that configured to sink the current from the load;
   a first control circuit configured to form switching cycles to operate the first transistor and the second transistor and regulate an output voltage substantially to a first value during a first operating mode of the power supply controller, and to inhibit forming switching cycles responsively to a second operating mode; and
   a second control circuit configured to control the second transistor and inhibit turning off the second transistor at least a portion of a time interval that the first control circuit inhibits forming switching cycles.

2. The power supply controller of claim 1 wherein the second control circuit is configured to force a first current through the second transistor that inhibits turning off the second transistor.

3. The power supply controller of claim 2 wherein the second control circuit includes a current mirror that forms a second current that is used to force the second transistor to conduct the first current to be ratioed to the second current.

4. The power supply controller of claim 1 wherein the second control circuit forms a Vgs for the second transistor that is no less than a threshold voltage of the second transistor.

5. A power supply controller comprising:
   a first drive circuit configured to form a first switching signal to drive a first transistor as a high side transistor that configured to supply a current to a load;
   a second drive circuit configured to form a second switching signal to drive a second transistor as a low side transistor that configured to sink the current from the load coupled in series with the first transistor;
   a first control circuit configured to form switching cycles to operate the first transistor and the second transistor and regulate an output voltage substantially to a first value during a first operating mode of the power supply controller, and to inhibit forming switching cycles responsively to a second operating mode; and
   a second control circuit configured to control the second transistor and inhibit turning off the second transistor at least a portion of a time interval that the first control circuit inhibits forming switching cycles wherein the second transistor is coupled as a first current mirror configuration with a third transistor to form a first current through the second transistor that inhibits turning off the second transistor.

6. The power supply controller of claim 5 wherein the second control circuit includes a fourth transistor configured to selectively couple the second transistor and the third transistor in the first current mirror configuration.

7. The power supply controller of claim 5 wherein the third transistor has a first current carrying electrode coupled to receive a second current from a second current mirror and coupled to a control electrode of the second transistor, the third transistor having a control electrode and a second current carrying electrode.

8. A power supply controller comprising:
a first transistor;
a second transistor coupled in series with the first transistor;
a third transistor;
a first control circuit configured to form switching cycles to operate the first transistor and the second transistor and regulate an output voltage substantially to a first value during a first operating mode of the power supply controller, and to inhibit forming switching cycles responsively to a second operating mode;
a second control circuit configured to control the second transistor and inhibit turning off the second transistor at least a portion of a time interval that the first control circuit inhibits forming switching cycles wherein the second transistor is coupled as a first current mirror configuration with the third transistor to form a first current through the second transistor that inhibits turning off the second transistor;
a first current carrying electrode of the third transistor coupled to receive a second current from a second current mirror and coupled to a control electrode of the second transistor, the third transistor having a control electrode and a second current carrying electrode;
a fourth transistor includes a first current carrying electrode coupled to the control electrode of the second transistor and to an output of the second current mirror, a second current carrying electrode coupled to the control electrode of the third transistor, and a control electrode.

9. The power supply controller of claim 8 further including a fifth transistor having a first current carrying electrode coupled to the second current carrying electrode of the fourth transistor, a second current carrying electrode coupled to the second current carrying electrode of the third transistor, and a control electrode.

10. The power supply controller of claim 9 wherein the control electrode of the fifth transistor is configured to receive a signal that has an opposite polarity of a signal receive by the control electrode of the fourth transistor.

* * * * *